US009241504B2

(12) United States Patent
Kolb

(10) Patent No.: US 9,241,504 B2
(45) Date of Patent: Jan. 26, 2016

(54) METHOD OF AND SYSTEM FOR WHEAT MILLING

(75) Inventor: Emil Kolb, Maple Grove, MN (US)

(73) Assignee: ARDENT MILLS, LLC, Denver, CO (US)

( * ) Notice: Subject to any disclaimer, the term of this patent is extended or adjusted under 35 U.S.C. 154(b) by 925 days.

(21) Appl. No.: 13/320,881

(22) PCT Filed: May 13, 2010

(86) PCT No.: PCT/US2010/034745
§ 371 (c)(1),
(2), (4) Date: Dec. 7, 2011

(87) PCT Pub. No.: WO2010/135152
PCT Pub. Date: Nov. 25, 2010

(65) Prior Publication Data
US 2012/0107475 A1 May 3, 2012

Related U.S. Application Data

(60) Provisional application No. 61/180,291, filed on May 21, 2009.

(51) Int. Cl.
| A23L 1/00 | (2006.01) |
| A23L 1/20 | (2006.01) |
| B02B 1/08 | (2006.01) |
| A23L 1/10 | (2006.01) |
| A23L 1/216 | (2006.01) |
| A21D 2/00 | (2006.01) |
| B02C 9/00 | (2006.01) |

(52) U.S. Cl.
CPC *A23L 1/1041* (2013.01); *B02C 9/00* (2013.01)

(58) Field of Classification Search
CPC .................................................. A23L 1/1041
USPC ............. 241/13, 227; 426/507, 483, 484, 622
See application file for complete search history.

(56) References Cited

U.S. PATENT DOCUMENTS

| 2,742,235 A | 4/1956 | Moen |
| 4,133,899 A | 1/1979 | Wolffing et al. |
| 5,211,982 A * | 5/1993 | Wellman .................. 426/622 |

(Continued)

FOREIGN PATENT DOCUMENTS

GB   2268386 A   1/1994

OTHER PUBLICATIONS

Shyam "Reduction of Tempering Time in Milling by Minimal Fissuring of Wheat" Master's Thesis, Kansas State University (1987).*

(Continued)

*Primary Examiner* — Rena L Dye
*Assistant Examiner* — Assaf Zilbering
(74) *Attorney, Agent, or Firm* — Faegre Baker Daniels LLP

(57) ABSTRACT

Processes and systems for commercial scale milling of wheat are disclosed. Processes include multiple tempering steps of controlled duration and cubing of the wheat kernel between two tempering steps. The cubing between the tempering breaks the kernels, or stresses the kernels, in a manner that enables a high degree of separation of the bran and endosperm early in the flour production process. An embodiment includes tempering for a first period between ½ hour and 2 hours, cubing in a roll crusher with longitudinal corrugations on one roll and circumferential corrugations on a second roll, removing fines from the cubed kernels, and further tempering of the cubed kernels for a period between ½ hour and 2 hours.

20 Claims, 5 Drawing Sheets

(56) References Cited

U.S. PATENT DOCUMENTS

| | | | |
|---|---|---|---|
| 5,773,066 A * | 6/1998 | Satake et al. | 426/483 |
| 2003/0083512 A1 | 5/2003 | Jakel et al. | |
| 2006/0068069 A1 | 3/2006 | Marchi et al. | |

OTHER PUBLICATIONS

Roll Crusher, Rainbow Trout Cultivation Technique, Xiong Liu et al. Agriculture Press, pp. 160-161.

International Search Report for PCT/US2010/034745 (2 pages).

A 30-Minute Conditioning Method for Micro-, Intermediate-, and Large-Scale Experimental Milling of Soft Red Winter Wheat (Finney et al.) Cereal Chem 1986, vol. 63, p. 18-21.

Ji Jianhai et al.; New Processes for Wheat Peeling and Milling; Agricultural Products Processing; 2007; China.

Karel Kulp: "Handbook of Cereal Science and Technology", Jan. 1, 2000, Marcel Dekker Inc. New York, XP002714190, 31 pages.

* cited by examiner

METHOD OF AND SYSTEM FOR WHEAT MILLING

CROSS REFERENCE TO RELATED APPLICATION

This application claims the benefit of the PCT Application, Ser. No. PCT/US10/034745, filed 13 May 2010, entitled METHOD AND SYSTEM FOR WHEAT MILLING, and the benefit of the U.S. Provisional Patent Application, Ser. No. 61/180,291, filed 21 May 2009, entitled METHOD AND SYSTEM FOR WHEAT MILLING, which are hereby incorporated by reference in their entirety.

FIELD OF THE INVENTION

The present disclosure relates to a process and system for milling wheat and the like. Aspects of the disclosure are particularly directed to flour milling methods and systems that include multiple tempering steps of controlled duration and breaking or impacting of the wheat kernel between two tempering steps.

BACKGROUND

Grain kernels, such as wheat kernels, generally include an inner seed of endosperm surrounded by outer layers of bran. Also within the outer bran layers, adjacent and smaller than the endosperm, is a wheat germ. Conventional commercial milling involves the steps of cleaning the wheat kernels, tempering for approximately 6 to 24 hours, and typically 18 to 24 hours, to soften and increase the moisture content of the wheat kernels, and then passing the kernels through a milling or grinding process including a sequence of counter-rotating mill rollers, also referred to herein as roll stands or roll sets, that separate the outer bran layers and germ from the endosperm through a scraping or abrading action. A roll set is typically operated with a faster roller and a slower roller providing an action whereby a wheat kernel tends to be held against the slow roll while the kernel is scraped by the fast roll. Each roll set produces product and also some small particulates referred to as fines. A typical flour mill will include a sequence of roll sets and sorters such as sifters which provide differing grades of flour and as designed, progressively separate the outer bran layer from the inner endosperm, which endosperm is ground into flour. The output from each set of rollers is sorted into multiple streams, typically based on particle size and density differences, to separate the endosperm from the bran and germ, and to direct higher and lower mineral-containing product to selected roller sets.

The desired milled flour is granular endosperm with some granular germ, with as little as possible of bran and mineral content in the flour. Germ can be an additional product. Conventional dry milling is described in Chapter 6, pages 125-145 of *Principles of Cereal Science and Technology*, Second Edition, R. Carl Hoseney (American Association of Cereal Chemists. Inc., 1994), hereby incorporated by reference.

It is generally preferred during the grinding process, particularly at the front end of a flour mill, that the bran layers be retained in sections as large as possible to facilitate the segregation of the bran from the desired endosperm. If the grain kernels are not tempered with a fluid such as water before passing through the rollers, the kernels will shatter when passed through the rollers. That shattering breaks the bran into small segments that are more difficult to separate from the desired flour. Tempering of wheat kernels is well known in the art and means the water addition and the corresponding resting time for the water to penetrate the wheat kernel. The tempering conditions or toughens the bran, providing it with a more flexible like texture that is resistant to the shattering. Tempering also helps to establish desired moisture content prior to entry into the roller sets, which assists in controlling the fine particulate flour material. Tempering also imparts characteristics to the endosperm that tend to make it more readily separable from the bran layers, and contributes attributes, such as moisture content, that assist in the production of better quality flour. During tempering the endosperm swells, loses its glassiness appearance and grows sodden. Long tempering periods, in the 6 to 24 hour range, and often in the 18 to 24 hour range, are typically needed as it takes time for the moisture to dampen the inner sections of the kernel. It also appears that the dampening enters in particular through the portion of the kernel where the germ resides. The dampening appears to migrate from the outside of the kernel that is in direct contact with the water, toward the inside of the kernel, which takes time, with most of the dampening entering through the germ.

Although tempering in commercial scale systems typically encompasses an 18 to 24 time period, for quick-turnaround testing purposes, an experimental micromilling method discloses a double fifteen minute tempering (Cereal Chemistry, Volume 62, No. 6, 1985, pages 454-458, *Experimental Micromilling: Reduction of Tempering Time of Wheat from 18-24 Hours to 30 Minutes*, K. F. Finney and L. C. Bolte). The article teaches processing of 50 gram or 100 gram samples of wheat through a pretemper of 2% moisture for 15 minutes, followed by a prebreak through a Tag-Heppenstall moisture meter roll set and then tempered to 15% moisture for 15 minutes. This process allows determining the quality of the small wheat sample in 50 to 60 minutes, consistent with an about 1-hour time period for loadings of wheat for export shipping.

The time and capacity throughput associated with tempering in a commercial facility adds to the equipment and time requirements of a mill for the production of flour. A longer processing time translates to increased costs for a given output of flour. For a given output of flour the tempering time impacts, for example, the time of plant personnel, holding tank capacities, on-site storage bins, and on-site grain transporting equipment requirements. Subsequent to tempering the wheat is milled in a sequence of roll sets and sifting equipment into flour of varying grades. The more bran that is released as small particles, the more difficult it is to remove the bran and form flour of low mineral content.

Wheat flour is milled throughout the world in large quantities. An improvement in plant capital or operating costs, or improved production efficiency, will be beneficial.

SUMMARY

The present invention addresses improved method and apparatus for tempering wheat and for production of wheat flour from wheat kernels having endosperm and germ within bran. The system is applicable to commercial scale production, such as for systems sized for processing at least about 4½ metric tons per hour of wheat which corresponds generally to the production of approximately 75 hundred weights (cwt, one hundred pounds) of flour per hour for a conventional flour mill. In one aspect the wheat kernels are cleaned and then tempered through a tempering process having two stages. However, the total tempering time from the combined stages is less than about four hours. The first temper involves tempering the wheat kernels with temper mix for a first time period between about ½ hour and about 2 hours. The temper mix typically includes water or chlorinated water. Thereafter, the process includes cubing the kernels. The cubing process also produces fines. The process next encompasses removing fines finer than about 900 to 1200 microns in size from the cubed kernels foamed in the cubing process. Subsequent to separating the fines and the cubed kernels, the process includes further tempering the cubed kernels with a temper mix for a second time period between about ½ hour and about 2 hours. Thus, the total tempering time is less than the conventional 18 to 24 hours and yet, it has been found, together with the cubing, adequately prepares the wheat for a grinding process foaming flour through a sequence of mill rollers.

Cubing or fracturing the kernels can release some dirt that is not released in the cleaning, and produce some of the fines. It can also advantageously release the germ in larger segments than are produced in standard flour milling processes. Accordingly, in one aspect the invention includes sorting or sifting the kernel segments prior to the second tempering to remove the fines. The sifting can also remove the germ for separate recovery. After the second tempering the cubed kernels can be milled into flour through a sequence of mill rollers and sorters. Preferably the second tempering includes a moving temper that alleviates the tendency of the kernels to clump or stick together. The moving temper can be for a time period of approximately six to ten minutes. Where it is particularly desired to recover germ, the process of removing fines can also remove material finer than about 1000 microns in size, which can segregate a quantity of the germ from the smaller fines.

The cubing process can be performed by passing the wheat kernels through a roll crusher having generally longitudinally cut or oriented corrugations on one roller and generally circumferentially cut or oriented corrugations on the opposing roller.

In another aspect the invention includes a process for producing flour from wheat kernels having outer bran, inner endosperm and inner germ. The process includes cleaning preferably at least 4½ metric tons per hour of the wheat kernels, tempering the cleaned kernels in a first temper mix for less than about 1½ to 2 hours, and then fracturing the kernels into kernel segments, each segment substantially including bran and endosperm, the fracturing also freeing germ and generating fines. Sifting is performed to remove fines, as is rewetting of the kernel segments with a second temper mix. After a time period of between about three-quarters of an hour and about 1½ to two hours, the rewetted kernels are further sifted and/or directed to milling through a sequence of rollers to produce flour.

In another aspect the invention includes a process of producing flour including cleaning at least about 4½ metric tons per hour of wheat kernels and tempering the kernels with temper mix for a time period less than about 1½ hours. The process then includes cubing the kernels to form cubed kernels such that at least 80% by weight of the kernels will not pass through a 1800 micron size mesh, the cubed kernels including bran and endosperm, and the cubing process generating fines. Sifting of the product of the cubing process is then performed to remove at least some of the fines, separating such fines from the cubed kernels. The process includes rewetting the cubed kernels with a second water mix for a time period between about ¾ hour and 1½ hours, and then milling the cubed kernels through a sequence of rollers to produce flour. Generally, a typical kernel may be fractured into approximately three relatively large segments during the cubing process, collectively comprising the significant portion, at least 90% of the kernel, and additional particulates. Other configurations, such as two large segments, are possible.

Another aspect of the invention includes a method of producing flour from wheat kernels having endosperm and bran including tempering the wheat kernels with a temper mix for a time period between about ½ hour and about 2 hours, and then cubing the tempered kernels to score the bran. The scored kernels go through further tempering with water for a time period between about ½ hour and about 2 hours, and the method includes producing kernel segments. The kernel segments then are processed by milling the kernel segments through a sequence of rollers.

In yet another aspect the invention includes a system for producing flour from cleaned wheat kernels having endosperm and bran. The system includes a first bin or container for holding the cleaned kernels in a temper mix, at least one roll crusher sized and configured to fracture at least 4½ metric tons per hour of the wheat kernels into cubed kernels, a moving temper for dampening the cubed kernels with a temper mix, and a sequence of mill rollers and separators or sifters for milling the cubed kernels into flour. In one aspect the roll crusher includes a roller with substantially longitudinal corrugations and an opposing roller with substantially circumferential corrugations.

BRIEF DESCRIPTION OF THE DRAWINGS

The advantages, nature and additional features of the invention will become more apparent from the following description, taken in connection with the accompanying drawings, in which.

DETAILED DESCRIPTION

Figure 1:
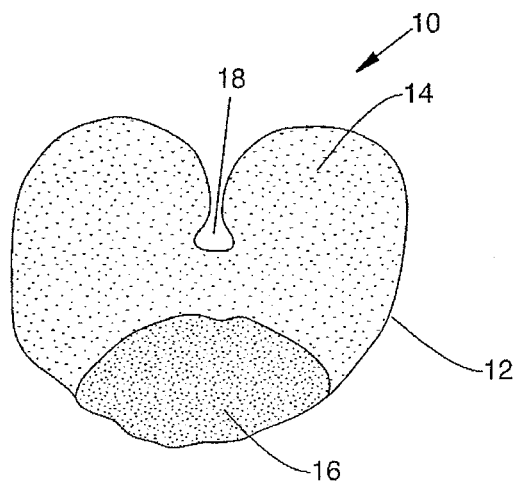
FIG. 1 is a simplified cross section view of a wheat kernel.
Figure 2:
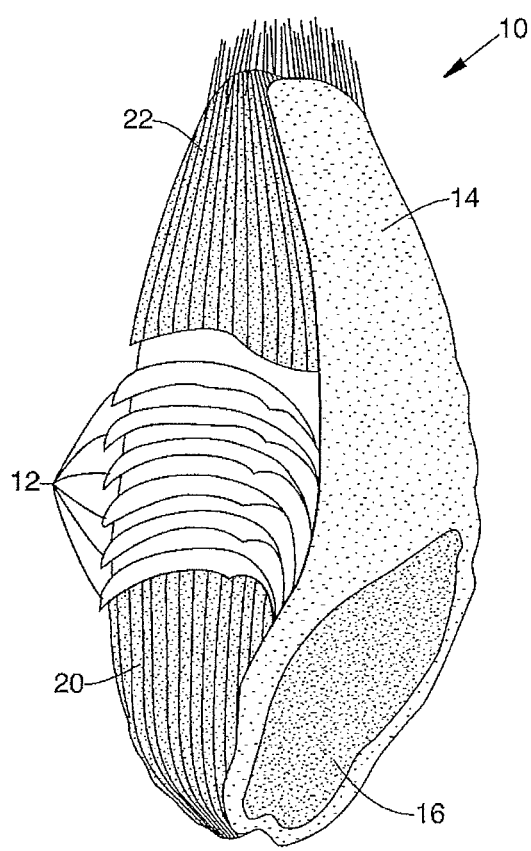
FIG. 2 is a simplified cutaway perspective view of a wheat kernel.

Referring now to FIG. 1 there is shown a schematic cross section of a wheat kernel 10. FIG. 2 shows a perspective cutaway of the kernel 10. For purposes of description, the kernel 10 includes three primary regions, an outer bran layer 12 surrounding an inner endosperm 14 and an inner germ 16. The bran 12 is comprised of several protective layers, typically constitutes about 14% of the kernel 10 by weight, and is high in fiber mineral content. Mineral content is often also referred to as ash, which is the content left after burning a sample of the wheat or the flour or the bran. The germ 16 is the embryonic wheat plant and typically constitutes only about 3% of the kernel 10. The remaining inner portion of the kernel is the starchy endosperm 14. The kernel 10 is typically elongated, as shown in FIG. 2, and includes a crease 18 that can collect dirt. The kernel 10 typically is thicker at a root end 20 than at a hair end 22. This configuration can affect the orientation of the kernels 10 as the kernels 10 enter and pass through mill sets.

Figure 3:
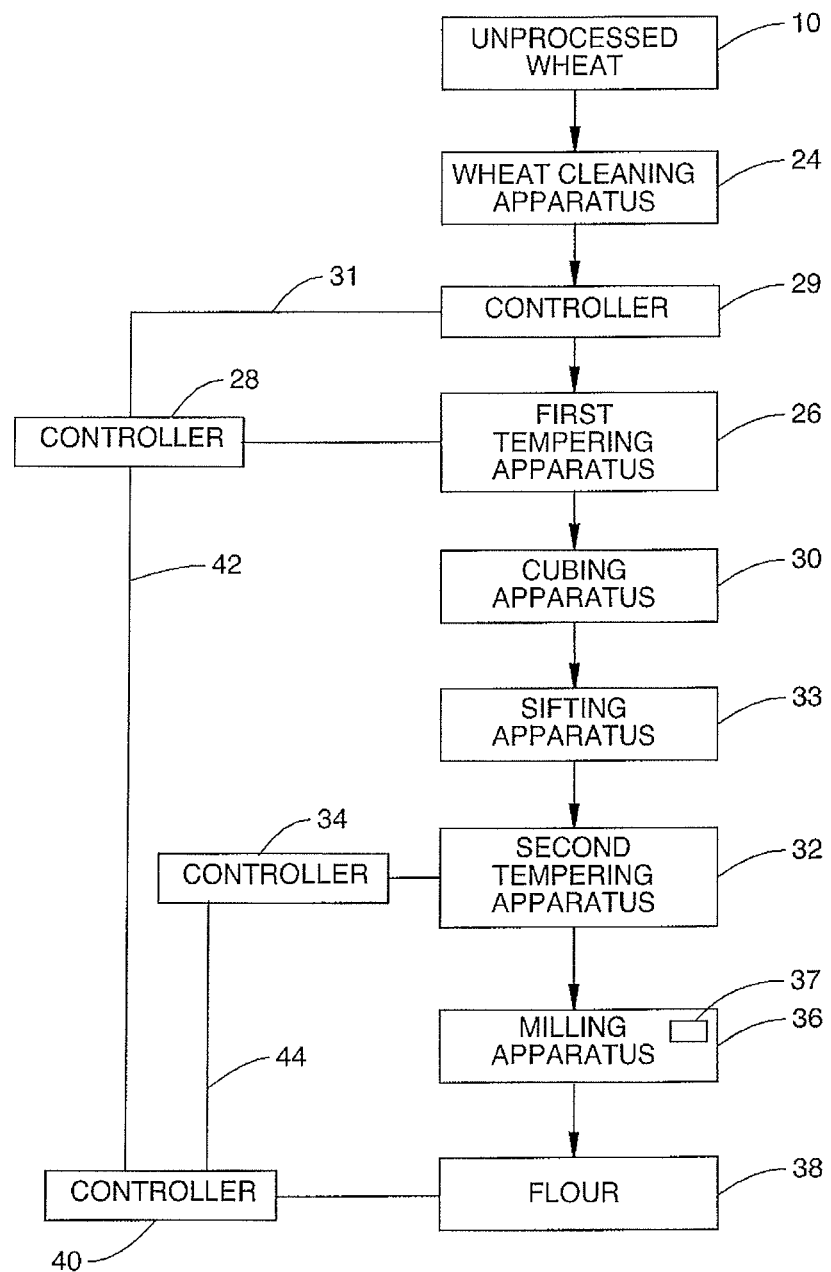
FIG. 3 is a schematic illustration of an exemplary embodiment of the invention.

FIG. 3 shows a general overview of an embodiment of the invention useful for commercial production of flour. This invention relates to the processing of wheat in commercial capacities, defined as at least four and one-half (4½) metric tons of wheat kernels per hour, which corresponds to the production of approximately 75 hundred weights (cwt) of flour per hour for an exemplary mill assumed to have a 75% conversion efficiency of wheat to flour. "Hundred weight" or "cwt" refers to one hundred pounds of flour. Unprocessed wheat kernels 10 are cleaned in conventional wheat cleaning apparatus 24. The term wheat is intended to include a wide variety of wheat types including those commonly described by terms such as hard, soft, red, white, winter, spring, waxy, partial waxy, and durum, among others. Wheat is commonly used for foods such as bread, cakes and related bakery products, and for noodles, wafers and pastas, among many other food products, as is well known. Wheat that is delivered to a mill, unloaded from a truck, rail car or ship, and conveyed into a mill elevator typically contains a percentage of non-wheat kernel components or foreign material. These can include seeds, underdeveloped wheat kernels, insects, stems, stones and other debris. Before milling this debris is removed in a cleaning apparatus 24. Numerous wheat cleaning machine types exist, but most mills include equipment that removes debris based on size, shape, density and magnetism. An exemplary separation apparatus 24 includes a combination of a magnetic separator to remove tramp metal, a milling separator to separate undersized and oversized material, an aspirator using air to separate materials of differing densities than the wheat, which can include, for example, shriveled wheat and chaff, a disk separator having cavities in rotating disks that exclude or accept grains based on size, a scourer that removes molds and dirt adhering to wheat kernels using an abrasive screen or surface, and a gravity table having an inclined vibrating plane that cleans wheat by separation based on density and fluidization.

After cleaning the cleaned wheat kernels 10 are passed to first tempering apparatus 26. The first tempering apparatus 26 can include any type of commercial plant equipment that causes the wheat kernels 10 to be wetted with a temper mix for a selected period of time. A typical temper mix comprises water, or a water mix that may include material that reduces bacteria count, such as through chlorination of the water. Such apparatus can include, for example, dampeners, conveyors, tanks and other containers, pipes and pumps to convey water, misters or other spray devices. Communicating with the first tempering apparatus 26 is a controller 28. Controller 28 can also receive communication from a wheat moisture controller 29 through link 31. Controller 28 controls the period of time that the wheat kernels 10 are contained in the first tempering apparatus 26 prior to passage to a cubing apparatus 30. It is desirable to have generally uniform moisture content upon exit from the first tempering apparatus 26. In accordance with one aspect of the invention, the kernels 10 experience the first tempering for less than about two hours, and more particularly for a time period between about one-half of an hour and about two hours. Although much shorter in time than conventional tempering, this first tempering does toughen the bran 12. The first tempering apparatus 26 may include a dampening device to wet the cleaned kernels 10 with the temper mix followed by slow passage of the kernels 10 through a first in, first out temper bin.

After the first tempering the wheat kernels 10 are passed through the cubing apparatus 30. The cubing apparatus 30 includes a set of rolls, such as in a roll crusher, sized and configured to break the kernels 10 into plural kernel segments 11, or to score or impact and stress the kernels 10 for subsequent breaking into plural kernel segments 11. Kernel segments 11 are the result of breaking the kernels 10 into relatively large sections, for example, of a size that will not pass through an about 1800 micron size mesh. This corresponds roughly to approximately one-third of the size of a typical wheat kernel 10. At least 50% by weight of the kernels 10 should not pass through the 1800 micron mesh upon discharge from the cubing apparatus 30, and preferably above 90% by weight or above 96% by weight should not pass through an 1800 micron mesh. It is desirable to minimize the amount of fines produced in the first cubing apparatus 30 and the rollers of the first cubing apparatus 30 can specifically be set such that no more than 2½% of the product coming through the first cubing apparatus 30 is less than about 900 to 1200 microns, such product referred to here as fines. It is desirable to minimize the amount of such fines produced in the cubing apparatus 30. As well known, wheat kernels vary in size. An article in *Acta Agrophysica,* 2005, 6(1), pages 59-71, hereby incorporated by reference, refers for example at pages 63, 64 to small kernels as being 2.0 to 2.5 mm thick, and large kernels being 3.1 to 3.5 mm thick. Physical Properties of Agricultural Materials and Food Products, page 11-T, Table 2.1 reports the average length of a wheat kernel to be 6.02 mm with a 0.41 mm standard deviation, the average intermediate diameter to be 2.79 mm length with a 0.37 mm standard deviation, and an average minor diameter to be 2.54 mm with a 0.08 mm standard deviation. Kernel segments can be, for example, approximately 1.8 mm to approximately 3 mm in the largest dimension. Accordingly, the cubing process is designed to break the kernels 10, or prepare the kernels 10 for subsequent breaking, into approximately three kernel segments 11 and an amount of fines. Subsequent to cubing a weight distribution of kernel segments 11 and fines may be in the range of 96% cubed kernels to 4% fines to 90% cubed kernels to 10% fines. The cubing apparatus 30 is preferably configured to produce kernel segments 11 such that the segments 11 expose the endosperm 14 otherwise contained within the bran 12. Instead of a design directed to scraping or abrading the bran 12 from the endosperm 14, as is typical in conventional milling, the cubing apparatus 30 is designed to produce kernel segments 11 having both bran 12 and endosperm 14. The cubing apparatus can also merely score or impress or impact the bran 12 layer, and stress or fracture the endosperm, without fully breaking the kernels 10, but preparing the kernels 10 for subsequent breaking of the kernel 10 in a first roller set 37 downstream from a second tempering apparatus 32. Accordingly, reference in this description and claims to the terms "cubing", "cubed", "cubing apparatus" or "cubed kernels" and the like refers to passing of kernels 10 through a cubing apparatus 30 wherein the kernels 10 are broken into kernel segments 11 and fines, or wherein the kernels are scored, or impressed, or impacted in a manner and thus prepared for subsequent breaking into kernel segments 11 and fines, whether or not the kernels 10 are actually completely broken in the cubing apparatus 30 or retain their configuration as a singular impacted kernel 10 until the first downstream roller set.

These terms accordingly refer to equipment, and the wheat product passing through such equipment, such as opposing rollers that are designed, configured and operated to act upon a commercial volume of wheat kernels 10, not in a manner to scrape or abrade the endosperm from the bran or to open the kernel and expose the endosperm as performed by conventional mill rollers. Differently, the action of cubing is one to either break the kernel 10 into a number of relatively large kernel segments 11 that each contain endosperm 14 and bran 12, or to merely score or impress or impact the bran 12 layer in a manner that leads to subsequent breaking into kernel segments 11. As in conventional milling operations, cubing or breaking of the kernel 10 also produces an amount of small particulates, often referred to as fines, in addition to the primary, relatively large kernel segments 11. A cubing apparatus 30 will preferably include one roller with generally longitudinally cut corrugations or generally longitudinal ridged surfaces, and a companion roller with generally circumferentially cut corrugations, often referred to as a LePage cut, or generally circumferential ridged surfaces. Preferably the rollers operate at a speed ratio of between 1:1 and approximately 1:3, with the longitudinally cut roller being the slower. Alternatively, the circumferentially cut roller can be the slower.

Figure 4A:
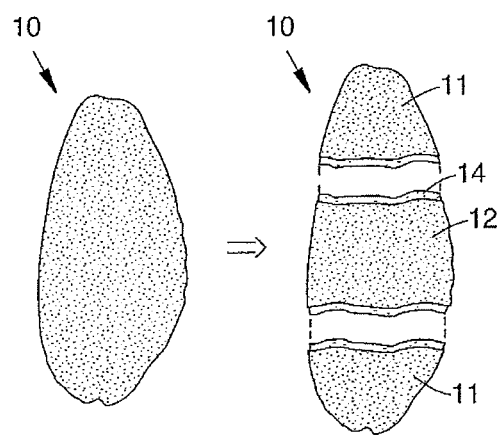
FIG. 4A is a schematic view of a wheat kernel broken into wheat segments.

FIG. 4A depicts on the left a wheat kernel 10, prior to cubing, which subsequent to cubing in the cubing apparatus 30 is broken into three kernel segments 11 as shown on the right. Each segment 11 includes exposed bran 12 and exposed endosperm 14. Germ 16 can also be exposed. The term exposed is meant to distinguish the circumstance where the inner kernel material such as the endosperm 14 is contained within the bran and not materially exposed or visible or directly in contact with its surrounding environment, from the circumstance where a portion of the endosperm 14 is exposed or visible or directly in contact with its surrounding environment. Exposed endosperm 14 can be wetted and obtain a desired moisture content faster than unexposed endosperm 14.

Figure 4B:
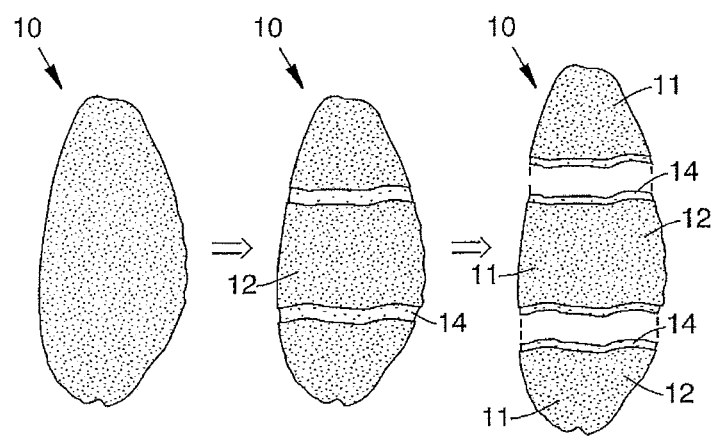
FIG. 4B is a schematic view of a wheat kernel scored and then broken into wheat segments.

FIG. 4B depicts a wheat kernel 10, prior to cubing on the left of the figure, which subsequent to cubing is scored such that a portion of the endosperm 14 is exposed by the score. As shown in the middle portion of FIG. 4B, the scored cubed kernel is not initially broken into completely separated kernel segments 11. The right portion of the figure shows the kernel after it is subsequently passed through the first roller set 37 downstream of the cubing apparatus 30, and is broken into kernel segments 11. Each segment includes exposed bran 12 and endosperm 14.

Figure 4C:
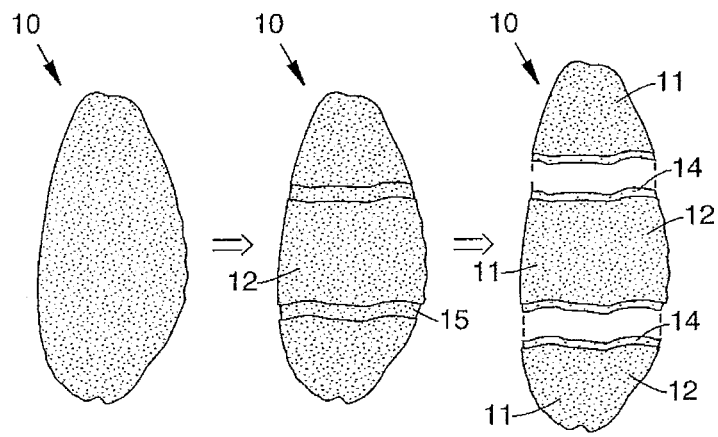
FIG. 4C is a schematic view of a wheat kernel impacted and then broken into wheat segments.

FIG. 4C depicts on the left side of the figure a wheat kernel 10 prior to cubing. The middle section of the figure shows the kernel 10 has been impacted, or impressed at a region 15, but the impression is not entirely through the bran 12. The impression begins the process of breaking the kernel 10 and stressing the endosperm but, similar to the scoring as depicted in FIG. 4B, does not fully break the kernel into kernel segments 11. The kernel 10 is fully broken into kernel segments, as shown on the right of FIG. 4C, in the first roller set downstream of the cubing apparatus 30. The fully broken kernel segments include exposed endosperm 14.

Figure 5:
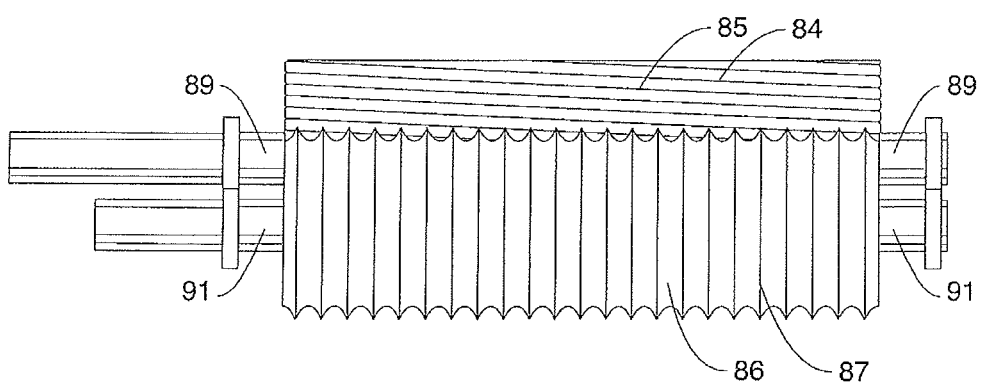
FIG. 5 is a schematic illustration of a cubing roller set in accordance with an embodiment of the invention.

Referring now to FIG. 5 there is shown an exemplary cubing apparatus 30 roll set including a roller 84 and a roller 86. Roller 84 is supported on shaft 89 and includes generally longitudinally cut corrugations 85. Roller 86 is supported on shaft 91 and includes generally circumferentially cut corrugations 87. Preferably roller 84 is operated as the slower of the set and roller 86 as the faster. The rollers can operate at a speed ratio of between about 1:1 to 1:3, including a ratio of about 1:2 or 1:2.5. The corrugations on longitudinally cut roller 84 can be at a spiral angle of between about 2% to about 4%.

It has unexpectedly been found that with a cubing process, even when the ridged surfaces of the rollers of the cubing apparatus are worn and lose a sharp edge, the inventive process is still successful. The worn or dulled rollers impact or impress the kernels in a manner that produces, downstream, from the cubing apparatus 30, kernel segments in the first roller set 37 downstream from the first cubing apparatus 30. The first roller set 37 downstream from the first cubing apparatus 30 can be a conventional mill roller set 37 in milling apparatus 36, or a slightly modified version of a first roller set with increased corrugations. Merely stressing the outer bran 12 layer by passage through the cubing apparatus 30, as noted in the discussion of FIG. 4, allows for the desired separation of endosperm 14 from bran 12 in later process steps.

It will be recognized that in any operation involving the processing of a huge number of individual elements, such as processing of the kernels 10 in a commercial scale milling operation, any individual kernel 10 may react in a manner different from the majority of the kernels 10 being processed. Accordingly, the described processing is that which acts upon a significant portion of the kernels 10, at least 65%, in the described manner. At least 50% of the kernels 10 passing through the first cubing apparatus 30 are actual broken kernel segments 11 of a size that will not pass through an about 1800 micron size mesh. After passing through the cubing apparatus 30 where a significant portion of the kernels 10 are cubed, the kernel segments 11 are thereafter passed to second tempering apparatus 32. Referring back to FIG. 3, prior to passage to the second tempering apparatus 32 is a sorting or sifting in conventional sifting apparatus 33. The sifting removes fines which otherwise would tend to enhance sticking together of kernel segments 11 when wetted in the second tempering. The second tempering apparatus 32 can include any type of commercial plant equipment that causes the wheat kernels or kernel segments to be wetted with a temper mix for a selected period of time. Such apparatus can include, for example, dampeners, conveyors, tanks and other containers, pipes and pumps to convey water, misters or other spray devices. Communicating with the second tempering apparatus 32 is a controller 34 that controls the period of time that the kernels or segments, together being referred to as cubed kernels, are contained in the second tempering apparatus 32 prior to passage to milling apparatus 36. In accordance with one aspect of the invention, the cubed kernels experience the second tempering for less than about two hours, and more particularly for a time period between about one-half of an hour and about two hours. Because the second tempering occurs on cubed kernels having exposed endosperm 14, or endosperm that has been stressed or impacted in the cubing apparatus, the endosperm 14 is softened by the water or water mix tempering medium more rapidly than if the tempering medium had to reach the endosperm 14 only through a fully in-tact and not impacted bran layer 12. It is believed that stressing and partial fracturing of the endosperm 14 by the cubing process may also contribute to a more rapid and extensive distribution of moisture throughout the endosperm 14 in the second tempering apparatus.

The second tempering apparatus 32 is preferably configured at least in part as a moving temper. For example, the second tempering apparatus 32 can include a moving conveyor, belt system, auger, screw conveyor or the like that receives, moves and wets the cubed kernels. A moving temper, as opposed to tempering through initial holding in a first in, first out container, is necessary to avoid clumping or sticking together of the cubed kernels 10, 11. While the second tempering can extend for a period up to approximately two hours, preferably at least the first minutes of the second tempering, for example the first six to ten minutes of the second tempering, is through a moving temper. After that time period there is less likelihood that clumping will occur.

After having sequentially experienced the first temper, the cubing, and the second temper, the wheat 10 has thus been prepared in a unique manner to allow for a surprisingly high percentage release of the endosperm 14 from the bran 12 in the first roller set 37. In a preferred system the cubed kernels are preferably passed through the milling apparatus 36. Milling apparatus 36 includes conventional mill roll sets and sifters that produce flour 38 of differing qualities and typically other products or material such as mill feed, so-called red dog (offal from the tail of the mill, together with some fine particles of wheat bran, wheat germ and wheat flour) and germ flakes. It has surprisingly been found that kernels 11 treated in accordance with the invention release in the first set of rollers 37 in the milling apparatus 36 a high percentage of endosperm 14 separated from bran 12 with a minimum amount of fine bran particulates. This allows less required conventional milling apparatus equipment during the subsequent milling process, for example less purifiers. Visual observation has shown noticeably less bran specs in product less than about 600 microns exiting a sifter immediately downstream of the first roller set of an inventive system as compared to that product exiting a sifter immediately downstream of the first roller set in a conventional milling system.

The moisture content of the flour 38 can be measured at various points in the flour production process via controller 40 which can communicate with controller 28 through link 42 and/or controller 34 through link 44 for adjustment of the time and/or temper mix addition during the first and/or second tempering. The first tempering will, however, continue for a time period between about one-half of an hour and about two hours. Similarly, the second tempering period will continue for a time period between about one-half of an hour and about two hours.

Because of the high percentage release of endosperm 14 in the first set of rollers 37 of the milling apparatus 36, the total energy required to process a given throughput of wheat 10 into flour 10 is reduced. It is believed that this energy savings can be in the range of approximately 10 to 20 percent of the total energy use of the mill from the first temper through the finished production of flour. These reductions result from the surprisingly high release of endosperm from the cubed kernels and kernel segments 11 in the first roller set 37 downstream from the cubing.

Figure 6:
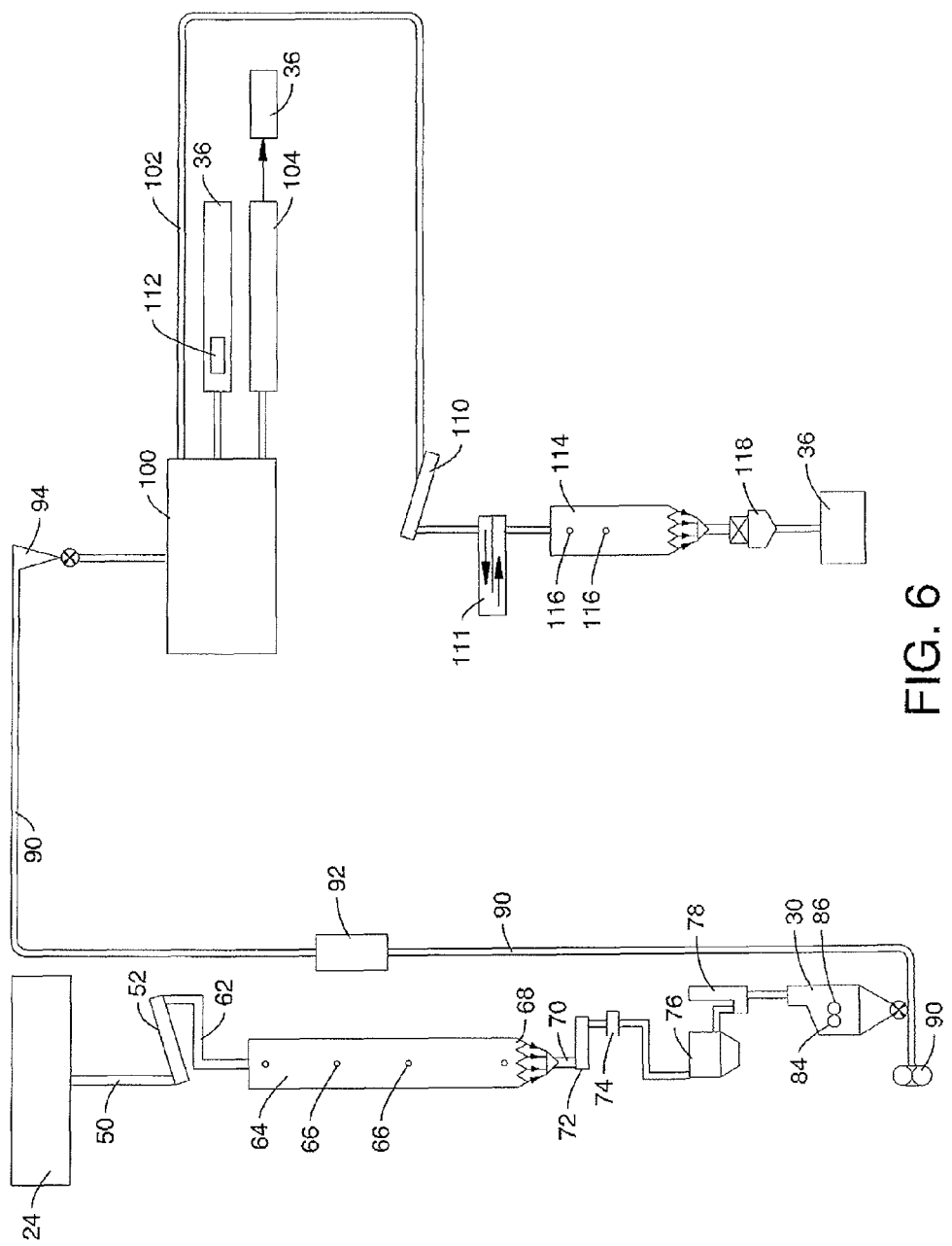
FIG. 6 is a schematic illustration of another embodiment of the invention.

Referring now to FIG. 6, there is shown additional detail of an embodiment of the invention. Wheat 10 from wheat cleaning house 24 passes through conduit system 50 to a dampener apparatus 52. The apparatus 52 is preferably a mixing conveyor which dampens the wheat uniformly. The moisture for dampening can be added through an automatic moisture controller or manually. Once wetted with temper mix in the dampener 52 the wheat kernels 10 pass through conduit 62 to a first in, first out temper bin 64. Temper bin 64 can be a vertically elongated container that includes a number of level sensors 66, or a continuous level probe or load cells to control the first temper period. Wheat kernels 10 reside within the dampener 52 and temper bin 64 for a tempering period of between about ½ hour and about 2 hours, or preferably for between about ½ hour and about 1½ hour. The kernels 10 are then discharged from the temper bin 64 through outlets 68 into conduit 70 and to a flow regulator 72. The flow regulator 72 can include a screw feeder or a scale or other device to maintain a continuous, uniform flow. The wheat 10 then is conveyed by appropriate conduits to a magnet 74 for removal of any remaining ferrous material, and then to a scourer 76. The scourer 76 can be a cleaning or peeling apparatus that cleans the outer bran 12 surface and crease 18 of the kernels 10. The scourer 76 is connected to a dust aspirator 78 to remove dust and other light particulates removed from the wheat 10 in the scourer 76.

From the scourer 76 and aspirator 78 the cleaned wheat kernels 10 are transferred to the cubing apparatus 30. The cubing apparatus includes the two cubing rollers 84, 86. The cubing rollers 84, 86 are preferably operated at a speed ratio of between approximately 1:1 to approximately 1:3. The cubed kernels, whether primarily fully separated kernel segments 11, impacted kernels 10 or some combination thereof, are then conveyed through conduit system 90, which can, dependent upon plant layout, include a lift elevator 92, a cyclone with airlock 94, and other well known conveying equipment.

An exemplary sifter 100 receives product from the cyclone 94 and calibrates the wheat into, for example, two fractions: a coarse fraction, and a fine fraction. The coarse fraction, comprising for example product above 900 microns, can be directed to a dampener 110 through transfer system 102. The fine fraction, comprising for example product below 900 microns, can be directed to a surge bin 104 which holds the fine product and can, for example, discharge the product into selected locations of the milling system 36. Alternatively, sifter 100 can calibrate the wheat into three fractions: a coarse fraction, a medium fraction and a fine fraction. The coarse fraction can be product coarser than approximately 1200 microns and is directed to the dampener 110. The medium fraction can be product in the range of 1000 microns, such as between approximately 500 microns and approximately 1200 microns and which should contain wheat germ 16 directed to a separate germ recovery system 112 or other selected locations in the mill system 36. The fine fraction, comprising for example product below 500 microns can be directed to the surge bin 104 which holds the fine product and can, for example, discharge the product into selected locations of the milling system 36. It will be recognized by those skilled in the art that separation fractions such as described are subject to practical limitations, and that the separation is not descriptive of 100% of the product that goes into each fraction. There will be some carryover among the various particulate and product sizes. The disclosure is based upon selection of equipment, known to those skilled in the art, directed to providing the desired fraction separations through, for example, knowledgeable selection of equipment and separation equipment or screen sizes. From the dampener 110 the cubed kernels are passed through a moving temper 111 for a residence time in the moving temper of minutes, for example approximately six to ten minutes. The moving temper apparatus 111 can comprise a chain conveyor, a screw conveyor, a storage container with a moving chain, or similar equipment. The tempered, cubed, silled and dampened kernel product then passes to a second temper bin 114 having a mechanism for level and residence time control, such as level controllers 116. Temper mix container 114 can be a vertically elongated container that includes a number of level sensors 116, or a continuous level probe or load cells useful to control the second temper period. The required level or temper time period can be used to control the rate of product exiting the feeding apparatus 72. The cubed kernels reside in the second temper bin for approximately 20 to 60 minutes and are then conveyed through a flow regulator 118 to the milling system 36.

There has been described improved method and apparatus for processing wheat and like grains. Based on the disclosure, it will be appreciated that variations may be made by those skilled in the art without departing from the invention or the scope of the appended claims.

What is claimed is:

1. A process of infusing temper mix into the endosperm of cleaned wheat kernels having endosperm and bran, comprising:

a. tempering at least 4½ metric tons per hour of the wheat kernels with temper mix for a first time period between about ½ hour and about 2 hours;
b. thereafter, cubing the wheat kernels, said cubing step performed by passing the wheat kernels through a roll crusher having a generally longitudinally oriented corrugations on one roller and generally circumferentially oriented corrugations on an opposing roller, said cubing step producing fines;
c. removing fines finer than about 900 to 1200 microns in size from the cubed kernels; and
d. further tempering the cubed kernels with temper mix for a second time period between about ½ hour and about 2 hours.

2. The process of claim 1 wherein the further tempering includes a moving temper.

3. The process of claim 1 wherein the removing step comprises removing material finer than about 1000 microns in size.

4. The process of claim 1 wherein the further tempering includes passing the cubed kernels through a moving temper wherein the wheat resides for a period of approximately six to ten minutes.

5. The process of claim 1, wherein the tempering for a first time period of (a) comprises passing the wheat kernels through a first in, first out temper bin and, and wherein the further tempering of (d) comprises passing the cubed kernels through a moving temper wherein the wheat resides for a period of approximately six to ten minutes.

6. The process of claim 1, wherein the cubing step produces cubed kernels and wherein the process further comprises milling the tempered cubed kernels of (d) through a sequence of mill rollers into flour.

7. The process of claim 6 wherein the period of the further tempering is controller by a feedback based on the moisture content of the flour.

8. The process of claim 1 wherein each of the first and second time periods is between about ½ hour and 1½ hours.

9. The process of claim 1, wherein said longitudinally oriented corrugations are at a spiral angle of between about 2% and about 4%.

10. The process of claim 1 wherein the cubing step separates germ contained in the wheat kernels and further comprising, after the further tempering, sifting to capture at least some of the germ.

11. The process of claim 1, wherein the cubing step further comprises producing cubed kernel segments, and wherein a portion of the cubed kernel segments comprise exposed endosperm.

12. The process of claim 1, wherein the cubing step further comprises producing cubed kernel segments, and wherein a portion of the cubed kernel segments comprise exposed endosperm.

13. A process of infusing temper mix into the endosperm of cleaned wheat kernels having endosperm and bran, the process comprising:
a. tempering at least 4½ metric tons per hour of the wheat kernels with temper mix for a first time period between about ½ hour and about 2 hours;
b. thereafter, cubing the wheat kernels, the cubing step performed by passing the wheat kernels through two opposing rollers, wherein a first of the two opposing rollers comprises generally longitudinally oriented corrugations and a second of the two opposing rollers comprises generally circumferentially oriented corrugations, the cubing step producing fines;
c. removing fines finer than about 900 to 1200 microns in size from the cubed kernels; and
d. further tempering the cubed kernels with temper mix for a second time period between about ½ hour and about 2 hours.

14. The process of claim 13, wherein the cubing step further comprises producing cubed kernel segments, wherein a portion of the cubed kernel segments comprise exposed endosperm.

15. The process of claim 1, wherein the process is performed without adjusting temperature.

16. The process of claim 13, wherein the process is performed without adjusting temperature.

17. The process of claim 13, wherein the removing step comprises removing material finer than about 1000 microns in size.

18. The process of claim 13, wherein the further tempering includes passing the cubed kernels through a moving temper wherein the wheat resides for a period of approximately six to ten minutes.

19. The process of claim 13, wherein the cubing step produces cubed kernels and wherein the process further comprises milling the tempered cubed kernels of (d) through a sequence of mill rollers into flour.

20. The process of claim 13, wherein each of the first and second time periods is between about ½ hour and 1½ hours.

* * * * *